United States Patent
Prakash et al.

(10) Patent No.: US 11,030,514 B2
(45) Date of Patent: Jun. 8, 2021

(54) METHODS, SYSTEMS AND COMPUTER PROGRAM PRODUCTS FOR CONTACTLESS PAYMENTS

(71) Applicant: MASTERCARD INTERNATIONAL INCORPORATED, Purchase, NY (US)

(72) Inventors: Mayank Prakash, Uttarakhand (IN); Satya Sudipta Padhiary, Maharashtra (IN); Vairag Jain, Uttar Pradesh (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/386,088

(22) Filed: Apr. 16, 2019

(65) Prior Publication Data

US 2019/0325286 A1  Oct. 24, 2019

(30) Foreign Application Priority Data

Apr. 19, 2018 (IN) .............................. 201811014925

(51) Int. Cl.
| | |
|---|---|
| *G06K 19/08* | (2006.01) |
| *G06Q 20/32* | (2012.01) |
| *G06K 19/07* | (2006.01) |
| *G06K 19/06* | (2006.01) |

(52) U.S. Cl.
CPC ....... *G06K 19/08* (2013.01); *G06K 19/06037* (2013.01); *G06K 19/0723* (2013.01); *G06Q 20/3276* (2013.01); *G06K 2019/06253* (2013.01)

(58) Field of Classification Search
CPC .............. G06K 19/08; G06K 19/0723; G06K 19/06037; G06K 2019/06253; G06Q 20/3276; G06Q 20/3278; G06Q 20/32
See application file for complete search history.

(56) References Cited

U.S. PATENT DOCUMENTS

| | | | |
|---|---|---|---|
| 8,127,999 B2 | 3/2012 | Diamond | |
| 8,196,131 B1 | 6/2012 | Behren et al. | |
| 9,092,776 B2 | 7/2015 | Dessert | |
| 9,324,067 B2 | 4/2016 | Os et al. | |
| 9,811,818 B1 * | 11/2017 | Xing | .................. H04M 1/2755 |
| 10,210,508 B2 | 2/2019 | Hammad et al. | |
| 10,250,774 B2 * | 4/2019 | Song | ................... H04N 1/00352 |
| 2010/0025464 A1 * | 2/2010 | Trueeb | .............. G01N 35/00871 235/385 |
| 2012/0109735 A1 | 5/2012 | Krawczewicz et al. | |
| 2013/0132218 A1 * | 5/2013 | Aihara | ............... G06Q 20/3276 705/21 |

(Continued)

OTHER PUBLICATIONS

PCT International Search Report and Written Opinion, Application No. PCT/US2019/023503, dated Jul. 1, 2019, 11 pps.

*Primary Examiner* — Sonji N Johnson
(74) *Attorney, Agent, or Firm* — Armstrong Teasdale LLP (57) ABSTRACT

The present disclosure relates to contactless payments using an electronic payment transaction environment. In particular, the disclosure provides methods, systems, and computer program products for implementing contactless payments based on a dual protocol display label including an optical code and an NFC tag, each configured to communicate merchant information for the purposes of enabling electronic payments to a merchant.

7 Claims, 6 Drawing Sheets

(56) References Cited

U.S. PATENT DOCUMENTS

| | | |
|---|---|---|
| 2013/0134213 A1 | 5/2013 | Pallakoff et al. |
| 2013/0317835 A1 | 11/2013 | Mathew |
| 2014/0006184 A1 | 1/2014 | Godsey |
| 2014/0266626 A1 | 9/2014 | Moulin et al. |
| 2014/0310174 A1 | 10/2014 | Heeter |
| 2015/0054621 A1 | 2/2015 | Lin et al. |
| 2016/0357938 A1 | 12/2016 | Matthew |
| 2017/0103622 A1 | 4/2017 | Priebatsch |
| 2019/0034939 A1 | 1/2019 | Thomas et al. |

\* cited by examiner

METHODS, SYSTEMS AND COMPUTER PROGRAM PRODUCTS FOR CONTACTLESS PAYMENTS

CROSS REFERENCE TO RELATED APPLICATIONS

This patent application claims priority to Indian Application No. 201811014925 filed on Apr. 19, 2018, the disclosure of which is incorporated by reference herein in its entirety as part of the present application.

BACKGROUND

The present disclosure relates to contactless payments using an electronic payment transaction environment. In particular, the disclosure provides methods, systems, and computer program products for implementing contactless payments based on a dual protocol display label.

The use of display labels or stickers ("display label") bearing an optical code for the purposes of communicating payment information to a payer are known in retail environments. Typically, the display label may include an optical machine readable code (for example, a bar code or a QR code) imprinted or otherwise affixed to a display surface of the display label. The optical code includes encoded payment information that is required for the payer to be able to electronically transfer payment to a merchant. The optical code may include information corresponding to the merchant's electronic payment account. The payer would typically scan the optical code using scanning hardware and a scanning software application capable of extracting the encoded information corresponding to the merchant's electronic payment account. The extracted information is thereafter used to implement an electronic transfer of funds from the payer's electronic payment account to the merchant's electronic payment account.

With the increasing use of smartphones and other digital devices having image capture (i.e., camera based) capabilities, image processing capabilities and wireless communication capabilities, the ability to scan such display labels, extract the merchant account information, and effect a payment transaction has now been conveniently integrated into handheld devices including mobile communication devices such as smartphones. A customer seeking to conclude a payment transaction (for example a retail payment transaction) now simply requires to scan a display label provided by the merchant (and which has the merchant payment account information encoded thereon) using a camera on the customer's mobile communication device. Thereafter, a software application within the device may extract the merchant payment account information from the captured image and effect the electronic payment transaction between a payment account associated with the customer and the merchant's payment account.

The display label typically includes any of print quality acrylic, polyester, plastic material, or paper. The label may additionally have an adhesive layer provided to enable the label to be affixed to any surface. The optical code may be imprinted or affixed on a surface of the display label that is intended to be viewable.

It has been found that conventional display labels and methods of contactless payment using such labels can be rendered ineffective for multiple reasons. Reasons include (i) damage to the printed surface of the display label, (ii) fading of the printed surface due to wear and tear or exposure to light, (iii) problems with the customer's mobile device camera (for example smeared lens surfaces), and/or (iv) unfavorable light conditions (for example insufficient light available for appropriate image capture, or the presence of glare that prevents the optical code from being properly imaged). In such situations, a user is typically forced to verbally acquire the payment account information from the merchant, and to thereafter manually enter such information into the software application for effecting the desired payment transaction. This often leads to a poor or sub-standard user experience.

There is accordingly a need for a solution that addresses these problems and which enables a payer to conveniently acquire merchant payment account information despite any problems in reading an optical code on a display label.

SUMMARY

The present disclosure provides a novel and inventive dual protocol display label and methods of implementing contactless electronic payment transactions using such dual protocol display label.

The disclosure includes a dual protocol display label for implementing electronic payment transactions. The dual protocol display label includes, a label substrate having at least one label display surface. An optical code is imprinted on the label display surface, wherein the optical code encodes merchant information. A near-field communication (NFC) tag is affixed to the label substrate, wherein said near field communication tag is configured to broadcast one or more data signals having said merchant information encoded therein. The merchant information identifies at least a merchant payment account and an acquirer organization at which the merchant payment account is maintained.

The optical code may in an embodiment, encode information identifying the dual protocol display label as a label enabling merchant information acquisition through both optical code scanning and near-field-communication protocol based wireless communication. Alternatively, or in addition, the near field communication tag may be configured to broadcast one or more data signals having encoded information identifying the dual protocol display label as a label enabling merchant information acquisition through both optical code scanning and near-field-communication protocol based wireless communication.

The disclosure additionally provides a contactless payment system including a dual protocol display label for implementing electronic payment transactions, and a processor implemented user device having optical code scanning capability and near-field communication protocol capability.

The dual protocol display label for implementing electronic payment transactions may include a label substrate having at least one label display surface. An optical code is imprinted on the label display surface, wherein the optical code encodes merchant information. A near-field communication (NFC) tag is affixed to the label substrate, wherein said near field communication tag is configured to broadcast one or more data signals having said merchant information encoded therein. The merchant information identifies at least a merchant payment account and an acquirer organization at which the merchant payment account is maintained.

The processor implemented user device may be configured to (i) acquire merchant information from the dual protocol display label either by scanning the imprinted optical code, or by receiving one or more data signals from the near-field-communication tag, (ii) receive a transaction amount, and (iii) initiate electronic payment of the transaction amount from a payment account associated with a user initiating the electronic payment transaction to a merchant payment account identified based on the merchant information acquired by the user device from the dual protocol display label.

The dual protocol display label within the contactless payment system may be configured such that the optical code encodes information identifying the dual protocol display label as a label enabling merchant information acquisition through both optical code scanning and near-field-communication protocol based wireless communication. Alternatively or in addition, the near field communication tag within the contactless payment system is configured to broadcast one or more data signals having encoded information identifying the dual protocol display label as a label enabling merchant information acquisition through both optical code scanning and near-field-communication protocol based wireless communication.

In an embodiment of the contactless payment system, the processor implemented user device is configured to operate in (i) a first information acquisition mode including an optical code scanning based information acquisition mode, and (ii) a second information acquisition mode including a near-field-communication based information acquisition mode. Further, said processor implemented user device is configured such that selection of an information acquisition mode from among the first and second information acquisition modes for the purpose of acquiring merchant information from the dual protocol display label, is based on a user input or user action.

The processor implemented user device of the contactless payment system may be configured to operate in (i) a first information acquisition mode including an optical code scanning based information acquisition mode, and (ii) a second information acquisition mode including a near-field-communication based information acquisition mode. Additionally, said processor implemented user device may be configured such that responsive to the user device failing to acquire the merchant information from the dual protocol display label through one of the first information acquisition mode and the second information acquisition mode, said user device initiates information acquisition from the dual protocol display label through the other of the first information acquisition mode and the second information acquisition mode.

The disclosure also provides a processor implemented user device for implementing a contactless payment system, including a processor, an optical code scanning apparatus, and a near-field communication protocol based wireless communication apparatus capability.

The processor implemented user device may be configured to acquire merchant information from a dual protocol display label configured for implementing electronic payment transactions, said dual protocol display label including (i) a label substrate having at least one label display surface, (ii) an optical code imprinted on the label display surface, and (iii) a near-field communication (NFC) tag affixed to the label substrate, wherein the optical code encodes merchant information, the near field communication tag is configured to broadcast one or more data signals having said merchant information encoded therein, and said merchant information identifies at least a merchant payment account and an acquirer organization at which the merchant payment account is maintained, and wherein said merchant information is acquired by the processor implemented user device either by scanning the imprinted optical code, or by receiving one or more data signals from the near-field-communication tag.

The processor implemented user device additionally receives a transaction amount, and initiates electronic payment of the transaction amount from a payment account associated with a user initiating the electronic payment transaction, to a merchant payment account identified based on the merchant information acquired by the user device from the dual protocol display label.

In an embodiment of the processor implemented user device, the dual protocol display label is configured such that the optical code encodes information identifying the dual protocol display label as a label enabling merchant information acquisition through both optical code scanning and near-field-communication protocol based wireless communication. Alternatively or in addition, the near field communication tag is configured to broadcast one or more data signals having encoded information identifying the dual protocol display label as a label enabling merchant information acquisition through both optical code scanning and near-field-communication protocol based wireless communication.

In another embodiment the processor implemented user device is configured to operate in (i) a first information acquisition mode including an optical code scanning based information acquisition mode, and (ii) a second information acquisition mode including a near-field-communication based information acquisition mode. Additionally, said processor implemented user device is configured such that selection of an information acquisition mode from among the first and second information acquisition modes for the purpose of acquiring merchant information from the dual protocol display label, is based on a user input or user action.

In an alternate embodiment, the processor implemented user device is configured to operate in (i) a first information acquisition mode including an optical code scanning based information acquisition mode, and (ii) a second information acquisition mode including a near-field-communication based information acquisition mode. The processor implemented user device may be further configured such that responsive to the user device failing to acquire the merchant information from the dual protocol display label through one of the first information acquisition mode and the second information acquisition mode, said user device initiates information acquisition from the dual protocol display label through the other of the first information acquisition mode and the second information acquisition mode.

The disclosure additionally includes a method for implementing a contactless payment system. The method includes the steps of (i) acquiring at a processor implemented user device, merchant information from a dual protocol display label configured for implementing electronic payment transactions, said dual protocol display label including (a) a label substrate having at least one label display surface, (b) an optical code imprinted on the label display surface, and (c) a near-field communication (NFC) tag affixed to the label substrate, wherein the optical code encodes merchant information, the near field communication tag is configured to broadcast one or more data signals having said merchant information encoded therein, and said merchant information identifies at least a merchant payment account and an acquirer organization at which the merchant payment account is maintained, wherein said merchant information is acquired at the processor implemented user device either by scanning the imprinted optical code, or by receiving one or more data signals from the near-field-communication tag, (ii) receiving a transaction amount at the processor implemented user device, and (iii) initiating electronic payment of the transaction amount from a payment account associated with a user initiating the electronic payment transaction, to a merchant payment account identified based on the merchant information acquired by the user device from the dual protocol display label.

In an embodiment of said method, the dual protocol display label is configured such that (i) the optical code encodes information identifying the dual protocol display label as a label enabling merchant information acquisition through both optical code scanning and near-field-communication protocol based wireless communication, or (ii) the near field communication tag is configured to broadcast one or more data signals having encoded information identifying the dual protocol display label as a label enabling merchant information acquisition through both optical code scanning and near-field-communication protocol based wireless communication.

In a particular method embodiment, the processor implemented user device is configured to operate in (i) a first information acquisition mode including an optical code scanning based information acquisition mode, and (ii) a second information acquisition mode including a near-field-communication based information acquisition mode. Further, said processor implemented user device is configured such that selection of an information acquisition mode from among the first and second information acquisition modes for the purpose of acquiring merchant information from the dual protocol display label, is based on a user input or user action.

In another method embodiment, the processor implemented user device is configured to operate in (i) a first information acquisition mode including an optical code scanning based information acquisition mode, and (ii) a second information acquisition mode including a near-field-communication based information acquisition mode, wherein responsive to a failure to acquire the merchant information from the dual protocol display label through one of the first information acquisition mode and the second information acquisition mode, information acquisition is initiated from the dual protocol display label through the other of the first information acquisition mode and the second information acquisition mode.

The disclosure also includes a computer program product for implementing a contactless payment system. The computer program product includes a non-transitory computer usable medium having computer readable program code embodied therein, the computer readable program code including instructions for (i) acquiring at a processor implemented user device, merchant information from a dual protocol display label configured for implementing electronic payment transactions, said dual protocol display label including (a) a label substrate having at least one label display surface, (b) an optical code imprinted on the label display surface, and (c) a near-field communication (NFC) tag affixed to the label substrate, wherein the optical code encodes merchant information, the near field communication tag is configured to broadcast one or more data signals having said merchant information encoded therein, and said merchant information identifies at least a merchant payment account and an acquirer organization at which the merchant payment account is maintained, wherein said merchant information is acquired at the processor implemented user device either by scanning the imprinted optical code, or by receiving one or more data signals from the near-field-communication tag, (ii) receiving a transaction amount at the processor implemented user device, and (iii) initiating electronic payment of the transaction amount from a payment account associated with a user initiating the electronic payment transaction, to a merchant payment account identified based on the merchant information acquired by the user device from the dual protocol display label.

DETAILED DESCRIPTION

The present disclosure provides a novel and inventive dual protocol display label and methods of implementing contactless electronic payment transactions using such dual protocol display label.

For the purposes of the present disclosure, the following terms shall be understood to have the corresponding meanings provided below.

"Accountholder" or "Customer" shall mean an authorized electronic payment account user who is making a purchase or effecting an electronic transaction using said electronic payment account.

"Active RFID tag" shall mean an internally powered RFID tag that periodically or continuously broadcasts a data signal, bearing information encoded within the RFID tag.

"Acquirer" shall mean a business (e.g., a financial institution or a merchant bank) that contracts with a merchant to coordinate with the issuer of a customers' payment account.

"Device having dual information acquisition capability" or "User device" shall mean any device that is capable of both image capture and near-field-communication (NFC) protocol based wireless communication. In an exemplary embodiment, a user device includes a mobile communication device having a camera and near-field-communication capability.

"Issuer" shall mean a financial institution that issues payment accounts and maintains a contract with a customer or account holder for repayment or settlement of purchases made on the payment account.

"NFC tag" shall mean an active RFID tag or a passive RFID tag configured to broadcast information based on the near-field-communication protocol.

"Optical code" shall mean an optical, machine readable representation of data that encodes descriptive information in a machine readable format. Without limitation, for the purposes of the present disclosure, an optical code may include any of linear or 1-dimensional barcodes, matrix codes or 2-dimensional codes, holograms, or any other visually depicted combination of characters, words, patterns, images, or symbols that may be used to encode information in an optical machine readable format.

"Passive RFID tag" shall mean an RFID tag with no internal power source, and which is powered by electromagnetic energy transmitted from an RFID reader, which uses such power to broadcast a data signal bearing information encoded on the RFID tag.

"Payment account" shall mean any account that may be used for the purposes of effecting an electronic payment or electronic transaction, and shall include any electronic transaction account, payment card account, bank account, or electronic wallet account.

"Payment network" shall refer to the intermediary between the merchant's acquirer and the customer's issuer (for example, Mastercard® or Visa®). The payment network primarily coordinates electronic payment transactions between acquirers and issuers, and additionally may coordinate clearing and settlement services to transfer payments from issuers to merchants.

Figure 1:
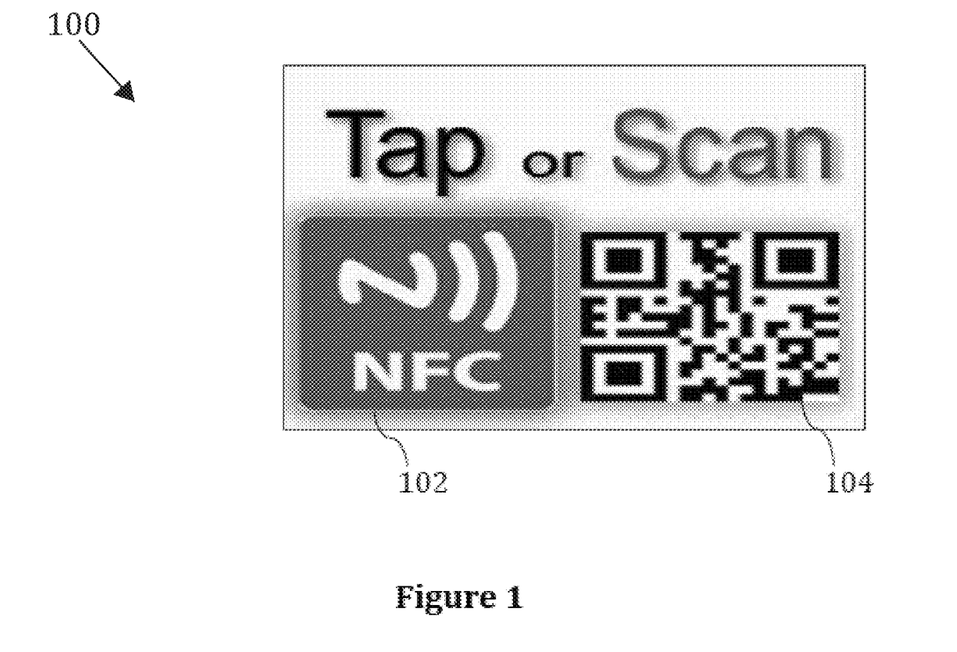
FIG. 1 illustrates an exemplary dual protocol display label in accordance with the present disclosure.

FIG. 1 illustrates an embodiment of a dual protocol display label 100 configured in accordance with the teachings of the present disclosure. The dual protocol display label 100 includes a unitary or multi-layered label. In an embodiment, said label includes any of print quality acrylic, polyester, plastic material, or paper. The label may include a dual display surface label, which is intended to have displayable print on both surfaces. The label alternatively may on one side (i.e., on a side that is not intended to be displayed), be provided with an adhesive layer to enable the label to be affixed to any surface.

As illustrated in FIG. 1, a display side surface of dual protocol display label 100 includes an optical code 104 imprinted or otherwise impressed or affixed thereon. While in the illustration of FIG. 1 optical code 104 includes a Quick Response (QR) code, it would be understood that said optical code may equally include any other optical machine readable code capable of encoding the information contemplated by the present disclosure.

In an embodiment of the disclosure, optical code 104 may include encoded (i) merchant payment account information, (ii) merchant information, and/or (iii) any other information that may be necessary or relevant to implement an electronic payment transaction from a customer's payment account into a merchant's payment account. In a particular embodiment of the disclosure, optical code 104 may additionally include descriptive information or a data field identifying the display label 100 as a dual protocol display label which simultaneously includes at least one other mechanism for communicating the information encoded within optical code 104. In an embodiment, optical code 104 may also include encoded information that specifies that said other mechanism for communicating the information encoded within optical code 104, is an NFC tag.

Dual protocol display label 100 additionally includes an NFC tag 102 disposed therein. The NFC tag 102 may be affixed to the dual protocol display label 100 in any number of ways. In one, the NFC tag is affixed by adhesive onto one side of the sticker. In another, the NFC tag may be sandwiched between a display surface of dual protocol display label 100 and a second underlying layer of material or a substrate material. In case of a double-sided display label, the NFC tag may be sandwiched between two opposed display surfaces of said display label, and may be read by touching an NFC reader enabled device to either side.

In an embodiment of the disclosure, NFC tag 102 may be configured to broadcast a data signal including encoded (i) merchant payment account information, (ii) merchant information, and/or (iii) any other information that may be necessary or relevant to effect an electronic payment transaction from a customer payment account to a merchant payment account. In a particular embodiment of the disclosure, the data signal broadcast by NFC tag 102 may additionally include descriptive information or a data field identifying the display label 100 as a dual protocol display label which simultaneously includes at least one other mechanism for communicating the information encoded within the data signal broadcast by NFC tag 102. In a specific embodiment, NFC tag 102 may additionally be configured to broadcast encoded information that specifies that said other mechanism for communicating the information being broadcast by the NFC tag, is an optical code.

Figure 2:
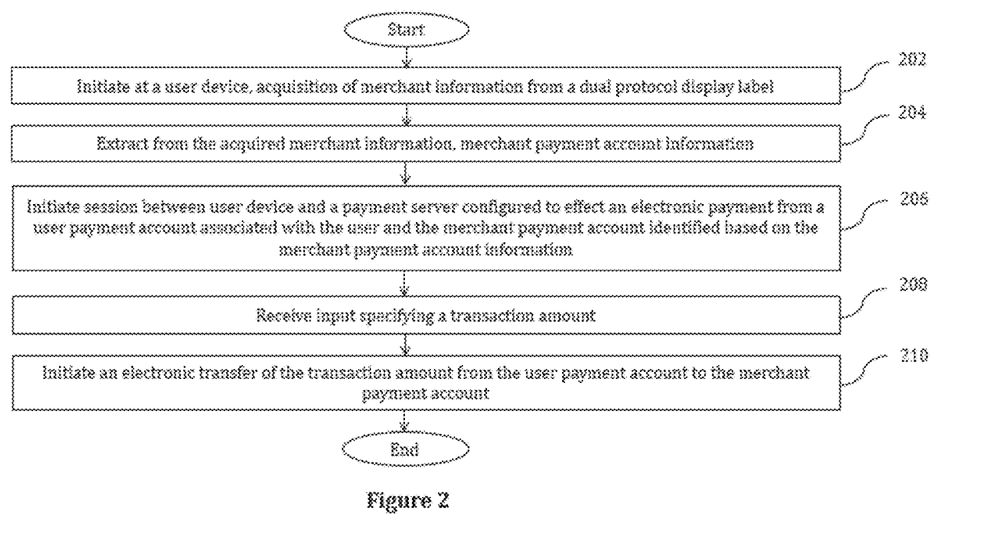
FIG. 2 illustrates a method of implementing an electronic payment transaction based on the dual protocol display label.

FIG. 2 illustrates a method of implementing an electronic payment transaction using on a dual protocol display label of the type illustrated in FIG. 1.

Step 202 includes initiating at a user device, acquisition of merchant information from a dual protocol display label. The user device of step 202 may include any device having dual information acquisition capability (i.e., capable of image capture and NFC protocol based wireless communication), and in an embodiment includes a mobile communication device having a camera and NFC capability. The user device may be used to acquire the relevant merchant information either from the optical code or from the NFC tag disposed on or within the dual protocol display label. It would be understood that in the event the merchant information is being acquired from the optical code, said information is obtained by obtaining an image of the optical code and processing the image to decode the information represented by said optical code. Likewise, in the event merchant information is being acquired from the NFC tag, said information is obtained by receiving one or more data signals from the NFC tag and processing said one or more data signals to decode the information encoded within said data signals. The obtained merchant information may in certain embodiments include all information necessary to effect an electronic payment to a merchant payment account, and may at the very least include acquirer bank information and an account identifier identifying the merchant's payment account with said acquirer bank.

At step 204 merchant payment account information is extracted from the merchant information acquired and decoded at step 202. In an embodiment of step 204, the extracted information includes all information necessary to effect an electronic payment to a merchant payment account, including at the very least the acquirer bank information and an account identifier identifying the merchant's payment account with said acquirer bank.

Step 206 includes initiating a network based communication session between the user device and a payment server that is configured to effect an electronic payment from a payment account associated with the user of said user device, and the merchant payment account that has been identified based on the merchant payment account information extracted at step 204.

Step 208 includes receiving input specifying a transaction amount. In an embodiment said input may include user input received through a user interface of the user device.

Step 210 includes initiating an electronic transfer of the specified transaction amount from the user's payment account to the merchant's payment account.

Figure 3:
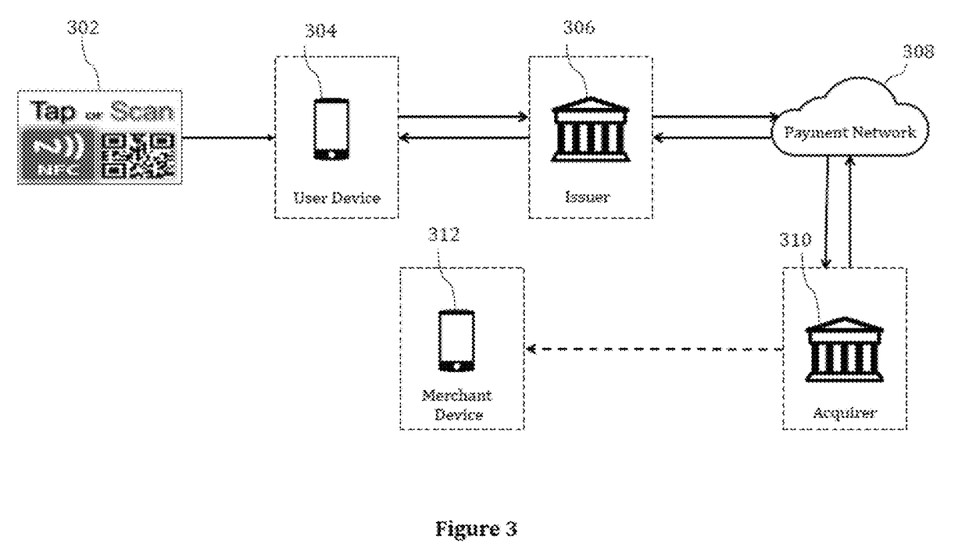
FIG. 3 illustrates a system environment configured for implementing an electronic payment transaction using the dual protocol display label.

FIG. 3 illustrates a system environment configured for implementing an electronic payment transaction using the method of FIG. 2.

As illustrated in FIG. 3, user device 304 receives merchant information from dual protocol display label 302, in accordance with one or more of the embodiments discussed above in connection with method step 202. Said user device 304 thereafter initiates an electronic payment of a specified transaction amount from a user's payment account to a merchant's payment account. As illustrated in FIG. 3, initiating and effecting said electronic payment involves communication between user device 304 and issuer 306, which communication includes transmitting the user payment account information, merchant payment account information, and specified transaction amount to the issuer, along with any other information that said issuer may require for carrying out an electronic payment. Upon receiving (from user device 304) the payment instruction and all necessary information for effecting the electronic payment, issuer 306 transfers said payment to the merchant's payment account that is maintained with acquirer 310, via payment network 308. Optionally, upon receipt of the payment into the merchant's payment account, acquirer 310 may notify the merchant regarding receipt of such payment, for example by forwarding an electronic notification to a registered merchant device 312.

Figure 4:
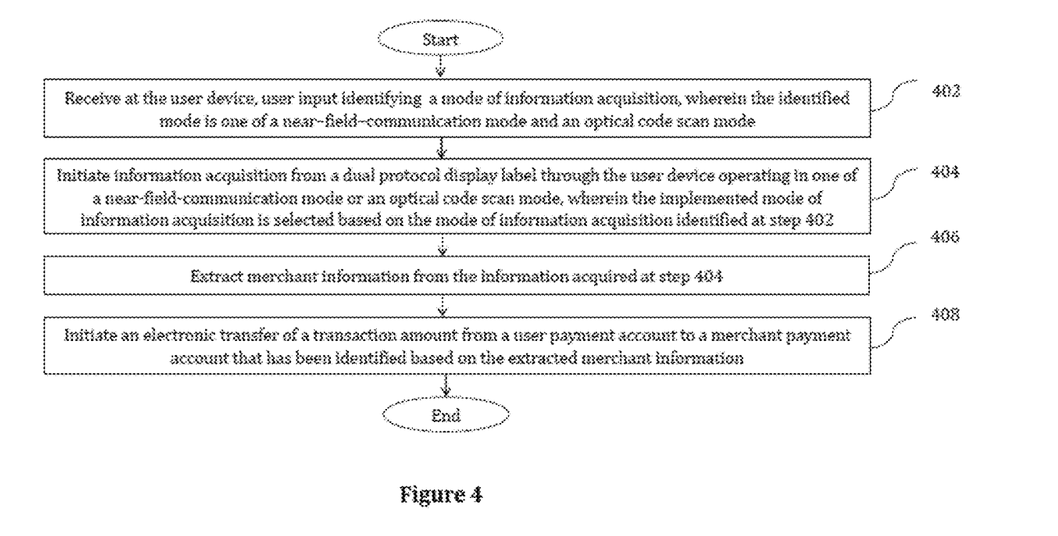
FIGS. 4 and 5 illustrate specific method embodiments of the method more generally shown in FIG. 2.

FIG. 4 illustrates a specific method embodiment of the method more generally described in FIG. 2. It would be understood that the method of FIG. 4 is intended to be implemented through a user device (i) having both near-field-communication capability and optical code scanning capability, and (ii) configured to implement a first information acquisition mode including a near-field-communication mode and a second information acquisition mode including an optical code scanning mode.

Step 402 includes receiving, at a user device having both near-field-communication capability and optical code scanning capability, a user input or user action identifying a mode of information acquisition, wherein the identified mode of information acquisition is one of a near-field-communication mode and an optical code scanning mode. In an embodiment, a user input for identifying the mode of information acquisition may be received through a user interface corresponding to the user device. In another embodiment, identification of the mode of information acquisition may be based on a user action. For example a user action of tapping the user device on the dual protocol display label, on the NFC tag within the dual protocol display label or an NFC tag region demarcated on the dual protocol display label may result in identification of the near-field-communication mode (which identification may in an embodiment, be based on the user device detecting the presence of an NFC tag within the dual protocol display label. Likewise, a user action of initiating scanning an optical code using an optical code scanner such as a camera or other scanning or imaging apparatus within the user device, may result in identification of the optical code scanning mode.

Step 404 includes initiating information acquisition from a dual protocol display label through the user device operating in one of the near-field-communication mode and the optical code scanning mode, wherein the implemented mode of information acquisition is selected based on the mode of information acquisition identified at step 402.

Step 406 thereafter includes extracting merchant information (including merchant payment account information) from the information acquired at step 404.

Step 408 includes initiating transfer of a transaction amount from a user payment account to a merchant account, using the extracted merchant information.

Figure 5:
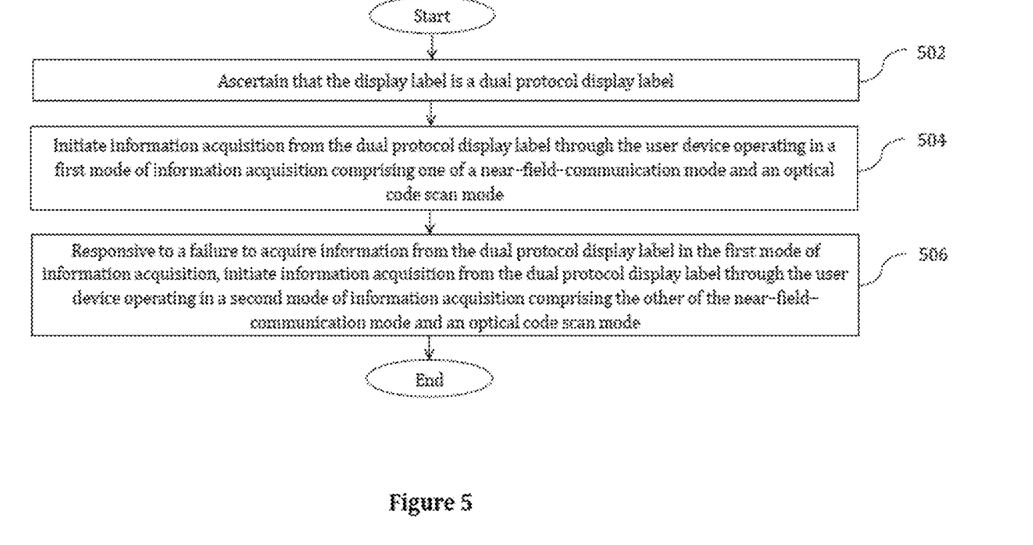

FIG. 5 illustrates a more specific embodiment of the methods of FIGS. 4 and 5.

Step 502 of FIG. 5 includes ascertaining that a display label bearing merchant information is a dual protocol display label. In one embodiment this determination may be based on user input at said user device, said user input specifying that the display label is dual protocol display label. In another embodiment, the determination may be based on image recognition capability built into the user device, which image recognition capability may rely on analysis and identification of images captured by an image capture device associated with the user device. In this embodiment, the user device may be configured to identify dual protocol display labels based on said image analysis.

In another embodiment, the determination at step 502 relies on a specific configuration of a dual protocol display label, wherein (i) an optical code imprinted or affixed to said dual protocol display label includes descriptive information or a data field identifying said display label as a dual protocol display label, and optionally also includes information specifying that the other mechanism supported by said dual protocol display label for communicating the information encoded within the optical code, is an NFC tag and/or (ii) an NFC tag applied to or disposed within said dual protocol display label is configured to broadcast a data signal that includes encoded descriptive information or a data field identifying said display label as a dual protocol display label, and optionally is configured to broadcast encoded information specifying that the other mechanism supported by said dual protocol display label for communicating the information being broadcast by the NFC tag, is an optical code.

Step 504 includes information acquisition from the dual protocol display label through the user device operating in a first mode of information acquisition, which first mode of information acquisition includes one of a near-field-communication mode and an optical code scanning mode. It would be understood that the first mode of information acquisition may be selected in accordance with any appropriate mechanism for selection, including any of the embodiments discussed in connection with steps 402 and 404 of FIG. 4.

At step 506, responsive to the user device failing to acquire merchant information from the dual protocol display label in the first communication mode, the method initiates information acquisition from the dual protocol display label through the user device operating in a second mode of information acquisition including the other of the near-field-communication mode and the optical code scanning mode.

Without limitation to the generality of step 506, events resulting in failure to acquire merchant information from the dual protocol display label when the user device is operating in an optical code scanning mode for information acquisition, include damage or wear and tear on the printed surface of the display label, damage to or smearing of optical apparatuses or other components of the optical code scanning apparatus, an error state within the optical code scanning apparatus, insufficient light, excessive light or glare, or insufficient imaging resolution of the optical code scanning apparatus.

Similarly, without limitation to the generality of step 506, events resulting in failure to acquire merchant information from the dual protocol display label when the user device is operating in a near-field-communication mode for information acquisition, include damage to the NFC tag, insufficient power for powering the NFC tag, electromagnetic interference preventing the user device from acquiring information from the NFC tag and/or damage to or an error state associated with one or more components of the near-field-communication apparatus within the user device.

Subsequent to acquisition of merchant information from the dual protocol display label in accordance with the method steps of FIG. 5, an electronic payment transaction between the user and the merchant may be implemented in accordance with the method steps more generally discussed in connection with steps 204 to 210 of FIG. 2.

Figure 6:
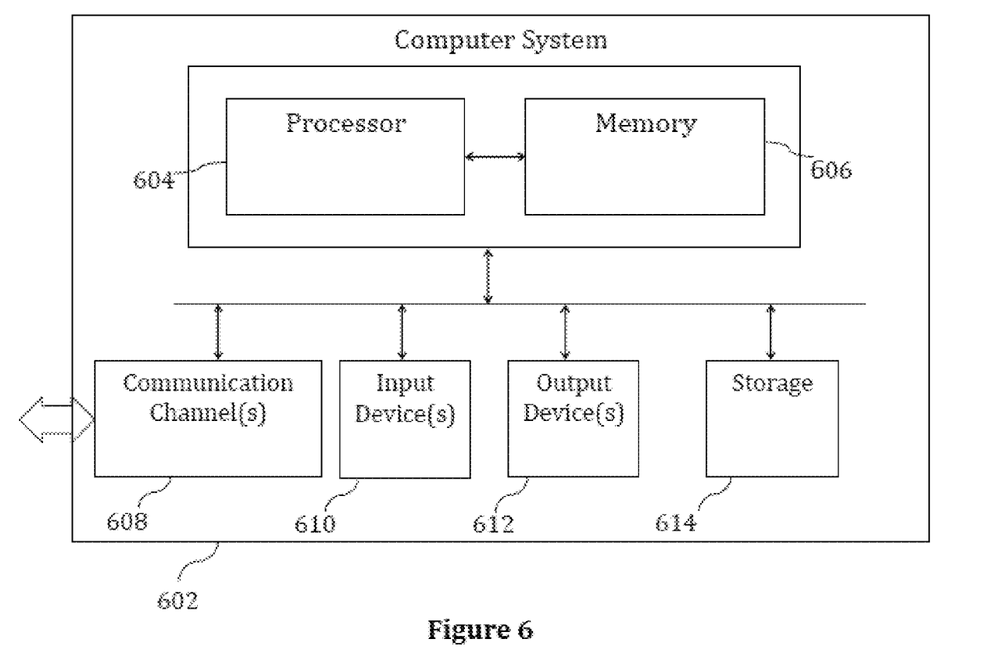
FIG. 6 illustrates an exemplary computer system according to which various embodiments of the present disclosure may be implemented.

FIG. 6 illustrates an exemplary computer system 602 for implementing the present disclosure.

The illustrated system includes computer system 602 which in turn includes one or more processors 604 and at least one memory 606. Processor 604 is configured to execute program instructions and may be a real processor or a virtual processor. It will be understood that computer system 602 does not suggest any limitation as to scope of use or functionality of described embodiments. The computer system 602 may include, but is not be limited to, one or more of a general-purpose computer, a programmed microprocessor, a micro-controller, an integrated circuit, and other devices or arrangements of devices that are capable of implementing the steps that constitute the method of the present disclosure. Exemplary embodiments of a computer system 602 in accordance with the present disclosure may include one or more servers, desktops, laptops, tablets, smart phones, mobile phones, mobile communication devices, tablets, phablets, and personal digital assistants. In an embodiment of the present disclosure, the memory 606 may store software for implementing various embodiments of the present disclosure. The computer system 602 may have additional components. For example, the computer system 602 may include one or more communication channels 608, one or more input devices 610, one or more output devices 612, and storage 614. An interconnection mechanism (not shown) such as a bus, controller, or network, interconnects the components of the computer system 602. In various embodiments of the present disclosure, operating system software (not shown) provides an operating environment for various softwares executing in the computer system 602 using a processor 604, and manages different functionalities of the components of the computer system 602.

The communication channel(s) 608 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth, or other transmission media.

The input device(s) 610 may include, but is not limited to, a touch screen, a keyboard, mouse, pen, joystick, trackball, a voice device, a scanning device, or any another device that is capable of providing input to the computer system 602. In an embodiment of the present disclosure, the input device(s) 610 may be a sound card or similar device that accepts audio input in analog or digital form. The output device(s) 612 may include, but not be limited to, a user interface on CRT, LCD, LED display, or any other display associated with any of servers, desktops, laptops, tablets, smart phones, mobile phones, mobile communication devices, tablets, phablets, and personal digital assistants, printer, speaker, CD/DVD writer, or any other device that provides output from the computer system 602.

The storage 614 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 602. In various embodiments of the present disclosure, the storage 614 may contain program instructions for implementing any of the described embodiments.

In an embodiment of the present disclosure, the computer system 602 is part of a distributed network or a part of a set of available cloud resources.

The present disclosure may be implemented in numerous ways including as a system, a method, or a computer program product such as a computer readable storage medium or a computer network wherein programming instructions are communicated from a remote location.

The present disclosure may suitably be embodied as a computer program product for use with the computer system 602. The method described herein is typically implemented as a computer program product, including a set of program instructions that is executed by the computer system 602 or any other similar device. The set of program instructions may be a series of computer readable codes stored on a tangible medium, such as a computer readable storage medium (storage 614), for example, diskette, CD-ROM, ROM, flash drives or hard disk, or transmittable to the computer system 602, via a modem or other interface device, over either a tangible medium, including but not limited to optical or analogue communications channel(s) 608. The implementation of the disclosure as a computer program product may be in an intangible form using wireless techniques, including but not limited to microwave, infrared, Bluetooth, or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it would be apparent that the present disclosure offers significant advantages by providing display labels capable of communicating merchant information through multiple alternate modes of communication. The existence of such multiple alternate modes of communication results in available alternatives for conveniently effecting an electronic payment to a merchant (without having to manually acquire and input the relevant merchant information) in case of a failure event or error state affecting any of said multiple alternate modes of communication.

While the exemplary embodiments of the present disclosure are described and illustrated herein, it will be appreciated that they are merely illustrative. It will be understood by those skilled in the art that various modifications in form and detail may be made therein without departing from or offending the spirit and scope of the disclosure as defined by the appended claims. Additionally, the disclosure illustratively disclose herein suitably may be practiced in the absence of any element which is not specifically disclosed herein and in a particular embodiment that is specifically contemplated, the disclosure is intended to be practiced in the absence of any one or more element which are not specifically disclosed herein.

What is claimed is:

1. A contactless payment system comprising:
   a dual protocol display label for implementing electronic payment transactions, the label comprising:
   a label substrate having at least one label display surface;
   an optical code imprinted on the label display surface; and
   a near-field communication (NFC) tag affixed to the label substrate;

wherein the optical code encodes merchant information and first additional information identifying the dual protocol display label as enabling acquisition of said merchant information through a near-field-communication protocol with said NFC tag;

wherein said NFC tag is configured to broadcast at least one data signal having said merchant information and second additional information identifying the dual protocol display label as enabling acquisition of said merchant information through scanning of said optical code; and wherein said merchant information identifies at least a merchant payment account and an acquirer organization at which the merchant payment account is maintained; and a processor implemented user device having optical code scanning capability and near-field communication protocol capability, wherein the processor implemented user device is configured to:

operate in a first information acquisition mode comprising an optical code scanning based information acquisition mode;

operate in a second information acquisition mode comprising a near-field-communication based information acquisition mode, acquire merchant information from the dual protocol display label either in the first information acquisition mode by scanning the imprinted optical code, or in the second information acquisition mode by receiving at least one data signal from said NFC tag, wherein responsive to the user device failing to acquire the merchant information from the dual protocol display label through one of the first information acquisition mode and the second information acquisition mode, said user device is configured to initiate information acquisition from the dual protocol display label through the other of the first information acquisition mode and the second information acquisition mode;

receive a transaction amount; and initiate electronic payment of the transaction amount from a payment account associated with a user initiating the electronic payment transaction to a merchant payment account identified based on the merchant information acquired by the user device from the dual protocol display label.

2. The contactless payment system according to claim 1, wherein said processor implemented user device is further configured such that selection of an information acquisition mode from among the first and second information acquisition modes for the purpose of acquiring merchant information from the dual protocol display label, is based on a user input or user action.

3. A processor implemented user device for implementing a contactless payment system, the user device comprising:
a processor;
an optical code scanning apparatus; and
a near-field communication protocol based wireless communication apparatus capability;
wherein the processor implemented user device is configured to:
operate in a first information acquisition mode comprising an optical code scanning based information acquisition mode;

operate in a second information acquisition mode comprising a near-field-communication based information acquisition mode, acquire merchant information from a dual protocol display label configured for implementing electronic payment transactions, said dual protocol display label comprising (i) a label substrate having at least one label display surface, (ii) an optical code imprinted on the label display surface, and (iii) a near-field communication (NFC) tag affixed to the label substrate, wherein the optical code encodes merchant information and first additional information identifying the dual protocol display label as enabling acquisition of said merchant information through a near-field-communication protocol with said NFC tag, said NFC tag is configured to broadcast at least one data signal having said merchant information encoded therein and second additional information identifying the dual protocol display label as enabling acquisition of said merchant information through scanning of said optical code, wherein said merchant information identifies at least a merchant payment account and an acquirer organization at which the merchant payment account is maintained, and wherein said merchant information is acquired by the processor implemented user device either in the first information acquisition mode by scanning the imprinted optical code, or in the second information acquisition mode by receiving at least one data signal from said NFC tag, wherein responsive to the user device failing to acquire the merchant information from the dual protocol display label through one of the first information acquisition mode and the second information acquisition mode, said user device is configured to initiate information acquisition from the dual protocol display label through the other of the first information acquisition mode and the second information acquisition mode;

receive a transaction amount; and initiate electronic payment of the transaction amount from a payment account associated with a user initiating the electronic payment transaction, to a merchant payment account identified based on the merchant information acquired by the user device from the dual protocol display label.

4. The processor implemented user device according to claim 3,
wherein said processor implemented user device is further configured such that selection of an information acquisition mode from among the first and second information acquisition modes for the purpose of acquiring merchant information from the dual protocol display label, is based on a user input or user action.

5. A method for implementing a contactless payment system, the method comprising:
acquiring at a processor implemented user device, merchant information from a dual protocol display label configured for implementing electronic payment transactions, said dual protocol display label comprising (i) a label substrate having at least one label display surface, (ii) an optical code imprinted on the label display surface, and (iii) a near-field communication (NFC) tag affixed to the label substrate, wherein the optical code encodes merchant information and first additional information identifying the dual protocol display label as enabling acquisition of said merchant information through a near-field-communication protocol with said NFC tag, wherein said NFC tag is configured to broadcast at least one data signal having said merchant information and second additional information identifying the dual protocol display label as enabling acquisition of said merchant information through scanning of said optical code, wherein said merchant information identifies at least a merchant payment account and an acquirer organization at which the merchant payment account is maintained, wherein said processor implemented user device is configured to operate in a first information acquisition mode comprising an optical code scanning based information acquisition mode, and in a second information acquisition mode comprising a near-field-communication based information acquisition mode, wherein said merchant information is acquired at the processor implemented user device either in the first information acquisition mode by scanning the imprinted optical code, or in the second information acquisition mode by receiving at least one data signal from said NFC tag, and wherein responsive to the user device failing to acquire the merchant information from the dual protocol display label through one of the first information acquisition mode and the second information acquisition mode, said user device initiates information acquisition from the dual protocol display label through the other of the first information acquisition mode and the second information acquisition mode;

receiving a transaction amount at the processor implemented user device; and initiating electronic payment of the transaction amount from a payment account associated with a user initiating the electronic payment transaction, to a merchant payment account identified based on the merchant information acquired by the user device from the dual protocol display label.

6. The method according to claim 5,
wherein said processor implemented user device is further configured such that selection of an information acquisition mode from among the first and second information acquisition modes for the purpose of acquiring merchant information from the dual protocol display label, is based on a user input or user action.

7. A computer program product for implementing a contactless payment system, the product comprising a non-transitory computer usable medium having computer readable program code embodied therein, the computer readable program code comprising instructions for:

acquiring at a processor implemented user device, merchant information from a dual protocol display label configured for implementing electronic payment transactions, said dual protocol display label comprising (i) a label substrate having at least one label display surface, (ii) an optical code imprinted on the label display surface, and (iii) a near-field communication (NFC) tag affixed to the label substrate, wherein the optical code encodes merchant information and first additional information identifying the dual protocol display label as enabling acquisition of said merchant information through a near-field-communication protocol with said NFC tag, wherein said NFC tag is configured to broadcast one or more data signals having said merchant information and second additional information identifying the dual protocol display label as enabling acquisition of said merchant information through scanning of said optical code, wherein said merchant information identifies at least a merchant payment account and an acquirer organization at which the merchant payment account is maintained, wherein said processor implemented user device is configured to operate in a first information acquisition mode comprising an optical code scanning based information acquisition mode, and a second information acquisition mode comprising a near-field-communication based information acquisition mode, wherein said instructions cause said merchant information to be acquired at the processor implemented user device either in the first information acquisition mode by scanning the imprinted optical code, or in the second information acquisition mode by receiving at least one data signal from said NFC tag, and wherein responsive to the user device failing to acquire the merchant information from the dual protocol display label through one of the first information acquisition mode and the second information acquisition mode, said instructions cause said user device to initiate information acquisition from the dual protocol display label through the other of the first information acquisition mode and the second information acquisition mode;

receiving a transaction amount at the processor implemented user device; and initiating electronic payment of the transaction amount from a payment account associated with a user initiating the electronic payment transaction, to a merchant payment account identified based on the merchant information acquired by the user device from the dual protocol display label.

* * * * *